Figure 1:
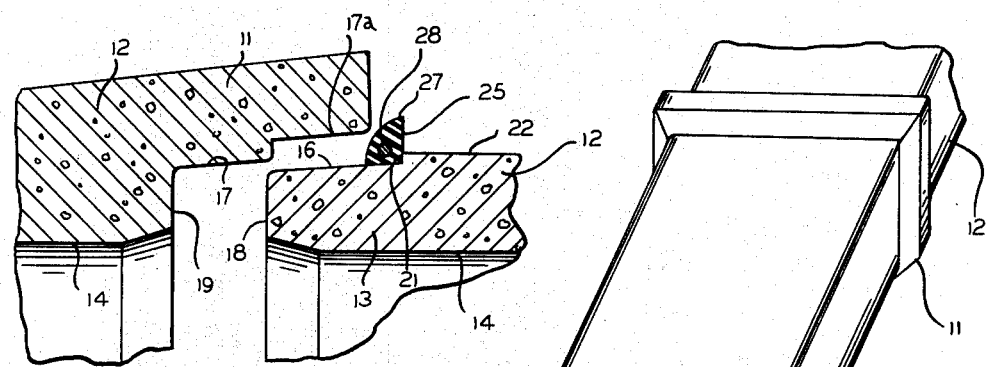

May 25, 1965  A. R. GAGNE  3,185,490

REINFORCED GASKET FOR BELL AND SPIGOT CONCRETE CONDUIT

Filed May 4, 1962

INVENTOR.
ARCHIE R. GAGNE
BY
ATTORNEY

United States Patent Office 3,185,490
Patented May 25, 1965

3,185,490
REINFORCED GASKET FOR BELL AND SPIGOT CONCRETE CONDUIT
Archie R. Gagne, Naperville, Ill., assignor to Gagne Enterprises, Inc., Naperville, Ill., a corporation of Illinois
Filed May 4, 1962, Ser. No. 192,480
2 Claims. (Cl. 277—170)

This invention relates to an improved reinforced gasket or sealing ring for use between the spigot and bell of a concrete conduit or pipe and to a bell and spigot joint where such gasket is used.

The structure disclosed herein finds special application for sealing joints between lengths of multi-duct concrete conduit of the kind disclosed in Gagne Patent No. 2,994,119, issued August 1, 1961. Conduit of the kind disclosed in said patent is particularly adapted for enclosing underground telephone cables or the like, and it is of paramount importance that the cables be protected against ground water.

While concrete of substantially no absorption can be made the joints between the conduit sections pose another problem. Where the cable is sheathed with polyolefin materials, gaskets and sealing compounds for the joints must not contain grease or oils because of their detrimental effect on, for example, polyethylene sheathed cables. The use of cutback asphaltic joint sealing compounds is of especial detrimental characteristics, although the compounds as such are effective against the entrance of ground water past the joint between adjacent conduit sections.

According to the present invention it is possible to seal the joint effectively by means of an improved gasket which can be forced into position over the spigot or tenon end of the conduit sections, the gasket being provided with steel reinforcement therein which is rather highly stressed so as to tightly grip the spigot or tenon. The gasket, on the other hand, although stressed in the manner described is yet capable of deforming along its outer periphery and in such a fashion as to bear tightly against the inner face of the bell end of the conduit.

As will be described, the stressing of the metal reinforcement within the gasket and the deformation of the peripheral portions of the gasket operate to make a tight seal between contiguous conduit sections when the sections are placed in abutting end to end relationship.

With the foregoing considerations in mind, it is a principal object of this invention to provide an improved reinforced gasket for bell and spigot concrete conduit characterized by it being unnecessary to use the same with the usual gasket auxiliary sealing materials.

Another object is to provide a gasket containing a reinforcing member which is stressed when the gasket is placed around the spigot end of the conduit section, the stressing of the reinforcing member causing the gasket to tightly grip the spigot end, the gasket yet having peripheral portions which can yield so as to engage tightly the bell end of the contiguous pipe.

Other objects and important features of the invention will be apparent from a study of the following specification taken with the drawing, which together describe and illustrate a preferred embodiment of the invention and what is now considered to be the best mode of practicing the principles thereof. Other embodiments may be suggested to those having the benefit of the teachings herein and such other embodiments are intended to be reserved especially as they fall within the scope and spirit of the subjoined claims.

Figure 2:
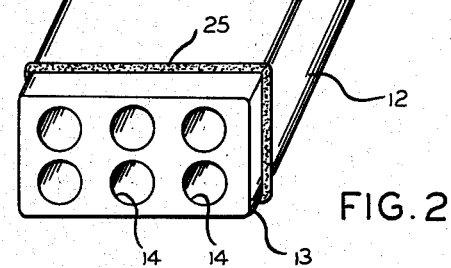
Figure 3:
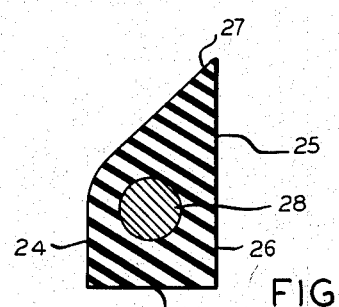
Figure 4:
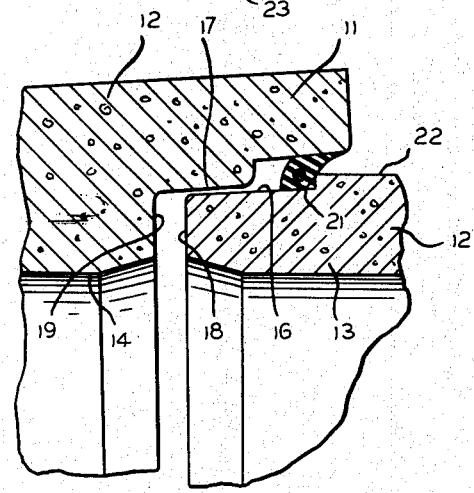

In the drawings:
FIG. 1 is a longitudinal section through a pair of contiguous conduit sections showing a reinforced gasket forming a part of the present invention in position on the spigot end of one of the pipes which is desired to be joined to the bell end of the other contiguous pipe section;
FIG. 2 is a perspective view of a typical conduit section showing the gasket forming part of the present invention in position on the spigot end of the section;
FIG. 3 is a transverse section taken through the reinforced gasket forming part of the present invention;
FIG. 4 is a view similar to FIG. 1, but showing the deformation of the gasket upon the forming of a tight joint at the bell and spigot ends of contiguous conduit sections; and
FIG. 5 is a view similar to FIG. 4 and showing the completed joint with the reinforced gasket in position thereat.

Referring now to the drawing, the reference numeral 11 indicates the bell end of a length of concrete conduit 12 and the reference numeral 13 represents the spigot end of a contiguous length of concrete conduit 12. The conduit lengths 12, 12 are laid in end to end relationship as seen in FIG. 2 and may be of the type as disclosed in the aforesaid Gagne patent. The conduit sections 12, 12 may have one or more bores 14 therein as are disclosed in said patent.

Figure 5:
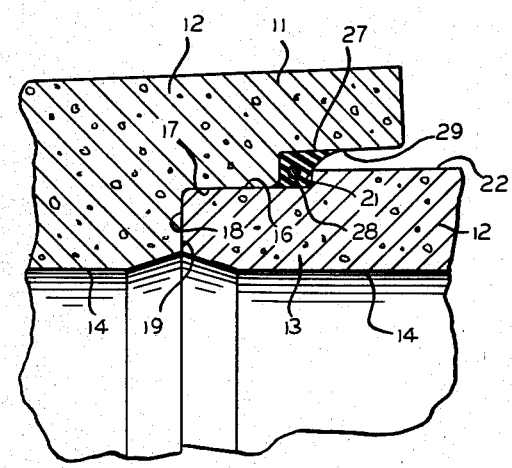

The spigot end 13 of the conduit section 12 has a tapered surface 16 which moves into engagement with a like tapered surface 17 of the bell end 11 when the conduit sections 12 are moved to the "home" position seen in FIG. 5, at which time an end surface 18 on the spigot end 13 is in engagement with a shoulder 19 formed in the bell 11.

The tapered surface 16 terminates at a shoulder 21 extending between the tapered surface 16 and the outer surface 22 of the pipe section 12, see FIG. 1. Ths tapered surface 16 and the shoulder 21 enable a reinforced gasket referred to generally by the reference numeral 25 to be located properly in position on the spigot end 13 of the conduit section 12.

Referring now particularly to FIG. 3 of the drawings, the reinforced gasket 25 is generally trapezoidal in cross section with a base 23 and spaced sides 24 and 26 extending substantially at right angles thereto. Side 24 is smaller in dimension than the side 25 and the two sides are joined by a bevelled surface or closing side 27.

The reinforced gasket 25 is molded integrally with a reinforcing ring 28 which is completely embedded therein, preferably made of steel or the like. The gasket 25 is placed in position on the spigot end of the conduit section 12 as seen in FIG. 2 and moved into position so that the side 26 contacts the shoulder 21. In so doing, the spigot end 13 is first lubricated by a suitable lubricant such as wetted bentonite, which is capable of being absorbed by the concrete of the section, and causing the gasket 25 to adhere firmly to the concrete. Preferably, a suitable guiding jig, not shown, may be provided for moving the gasket 25 into position against the shoulder 21, such a jig being in the form of a frame with an opening corresponding to the dimensions of the spigot 13. In moving the gasket 25 to the position aforesaid, reinforcement 28 is stressed in tension, to hold the gasket firmly in place. The stress in reinforcement 28 causes the base surface 23 to press very tightly against the tapered surface 16 of the spigot 13.

Prior to bringing the two contiguous sections together, the inner surface 17a of the bell 11 is smeared liberally with the bentonite compound described, and as the sections are brought together as seen in FIGS. 4 and 5, the reinforced gasket is deformed in the manner shown so that bevelled surface or closing side 27 is deformed so as to closely conform to the surface 17a of the bell 11.

This deformation of the gasket 25 continues, and not only does increasing deformation take place as is seen in FIGS. 4 and 5, but the outer peripheral portions of the gasket 25 are placed under compression to effect an extremely tight seal. When the two contiguous pipe sections are in the "home" position, the gasket 25 will be deformed as seen in FIG. 5 to present a thin edge 29 which together with the now completely deformed closing side or surface 27 prevents the entrance of water around the peripheral portions of the gasket 25. Also by reason of the stress in the reinforcement 28, water is prevented from moving past the inner surface 23 of the gasket 25.

From the foregoing description it is believed evident that there has been provided some new and useful improvements in the art of reinforced gaskets for bell and spigot concrete conduit. The gasket according to the present invention makes it unnecessary to use the conventional asphaltic compounds containing solvents which would work to the detriment of rubber and polyethylene sheathed cables.

While the invention has been shown in an environment consisting of a multi-bore concrete conduit such as is used for underground telephone cables or the like, it is not intended that it be limited to such environment. It is contemplated that a seal and joint as claimed herein embrace both concrete and clay pipe and tile, culvert sections, as long as such devices are closely fitted together in end to end relationship with one end nested within the end of a contiguous section.

Nor is it intended that the conduit recited in the claims be limited for use as a protecting device for cable or the like. It is intended that such conduit be used for carrying water, sewerage or the like. Wherever the expression "ring" is used in the claims it is intended to cover any shape in cross section of such conduit. Whatever the form of the ring it is intended to prevent both infiltration and exfiltration. The elastomer employed may vary according to soil conditions, and in acid soils the use of neoprene may be indicated. Likewise, in oil saturated soils in refinery areas buna-n rubber may be indicated.

While the invention has been described in terms of a preferred embodiment, it is not intended that its scope be limited by the precise embodiment herein shown. The scope of the invention accordingly is intended to be limited only by the claims here appended.

I claim:

1. In an improved seal for a bell and spigot joint between contiguous sections of concrete conduit of the type wherein a shoulder is formed on said spigot spaced from the end thereof, and a shoulder is provided on said bell spaced from the shoulder on said spigot when said sections are brought "home," the improvement wherein said seal comprises a molded endless reinforced elastomeric ring adapted to be stretched on said spigot, said ring having an endless elastically yieldable reinforcing member completely embedded therein and molded integrally therewith, said ring having a generally trapezoidal cross section with its base in contact with the surface of said spigot, short and long sides on said ring extending substantially at right angles from the base thereof and coterminous with a closing side inclined with respect to said base, said elastically yieldable reinforcing member being greatly stressed in tension when said ring is moved onto the tapered surface of said spigot to hold the base of said ring tightly against the tapered surface of said spigot, with the long side of said ring in engagement with the shoulder of said spigot, said short side of said ring being in engagement with the shoulder on said bell when said sections are brought "home," the closing side of said ring moving into contact with the inner surface of said bell during the homing movement of said sections to present a thin sealing edge in contact with the inner surface of said bell.

2. In an improved seal for a bell and spigot joint between contiguous sections of concrete conduit of the type wherein a shoulder is formed on said spigot spaced from the end thereof, and a shoulder is provided on said bell spaced from the shoulder on said spigot when said sections are brought "home," the improvement wherein said seal comprises a molded endless reinforced elastomeric ring adapted to be stretched on said spigot, said ring having an endless elastically yieldable reinforcing member completely embedded therein and molded integrally therewith, said ring having a generally trapezoidal cross section with its base in contact with the surface of said spigot, short and long sides on said ring extending substantially at right angles from the base thereof and coterminous with a closing side inclined with respect to said base, said elastically yieldable reinforcing member being greatly stressed in tension when said ring is moved onto the surface of said spigot to hold the base of said ring tightly against the surface of said spigot with the long side of said ring in engagement with the shoulder of said spigot, said short side of said ring being in engagement with the shoulder on said bell when said sections are brought "home," said ring deforming by the homing movement of said bell to present a thin sealing edge on said ring in contact with said bell.

References Cited by the Examiner

UNITED STATES PATENTS

| 2,314,386 | 3/43 | Brend | 277—208 X |
| 2,731,284 | 1/56 | Chamber et al. | 277—179 |
| 2,883,224 | 4/59 | Reising et al. | 277—179 |
| 2,982,569 | 5/61 | Miller et al. | 277—170 X |

FOREIGN PATENTS

| 464,087 | 4/37 | Great Britain. |
| 456,072 | 11/36 | Great Britain. |

LEWIS J. LENNY, *Primary Examiner.*

SAMUEL ROTHBERG, EDWARD V. BENHAM,
*Examiners.*